United States Patent [19]

Kruse

[11] 3,969,242
[45] July 13, 1976

[54] CONTROL SYSTEM FOR LIQUID-SOLID CONTACTING APPARATUS

[75] Inventor: David C. Kruse, Pittsburgh, Pa.

[73] Assignee: Dart Environment and Services Company, Los Angeles, Calif.

[22] Filed: Oct. 2, 1974

[21] Appl. No.: 511,336

Related U.S. Application Data

[63] Continuation of Ser. No. 349,153, April 9, 1973, abandoned, which is a continuation-in-part of Ser. No. 241,639, April 6, 1972, abandoned.

[52] U.S. Cl. .................................. 210/25; 210/33
[51] Int. Cl.² .................................... B01D 15/02
[58] Field of Search .................. 210/19, 25, 33, 97, 210/98, 101, 104, 105, 141, 142, 189, 268, 38 B; 23/270 R

[56] References Cited
UNITED STATES PATENTS

| | | | |
|---|---|---|---|
| 3,509,998 | 5/1970 | Pellett et al. .......................... | 210/98 |
| 3,565,798 | 2/1971 | Barnes .................................. | 210/19 |
| 3,580,842 | 5/1971 | Higgins ................................. | 210/25 |
| 3,677,937 | 7/1972 | Higgins et al. ........................ | 210/33 |

Primary Examiner—Charles N. Hart
Assistant Examiner—Ivars Cintins
Attorney, Agent, or Firm—Margareta LeMaire; Fred S. Valles

[57] ABSTRACT

A control system for a liquid-solid contacting apparatus and method therefor is designed to greatly minimize the dilution and contamination of the product streams as well as to perform the desired separation, concentration or conversion reactions at peak efficiency.

The liquid-solid contactor comprises a loop; a plurality of loop valves dividing the loop into loading, pulse and regenerating sections; feed means for supplying a feed containing sorbable material to the loading section; sorption solid substantially filling the loop; regenerating means for supplying regenerating fluid to the regenerating section; first removal means for removing the material desorbed by the regenerating fluid from the loop; second removal means for removing the processed liquid from the loop; pulse inlet means for supplying a pulse liquid to the pulse section and an outlet means for removing a portion of the pulse liquid from the loop.

The control system comprises first control means for controlling the removal of the portion of the pulse liquid which is used to periodically push a sorption solid in a direction counter to the direction of the flow of feed in the loop contactor and for controlling the removal and introduction of other liquid streams in volumetric relation to the amount of pulse liquid which has been supplied; second control means for allowing the sorption solid to be admitted into a pulse section of the loop and for stopping the supply of sorption solid when a given amount of sorption solid has been admitted into the pulse section; third control means for controlling the amount of sorption solid movement in the loop; and programming means for activating the feed means, regenerating means, first and second removal means, and the first, second and third control means in a prearranged order.

17 Claims, 10 Drawing Figures

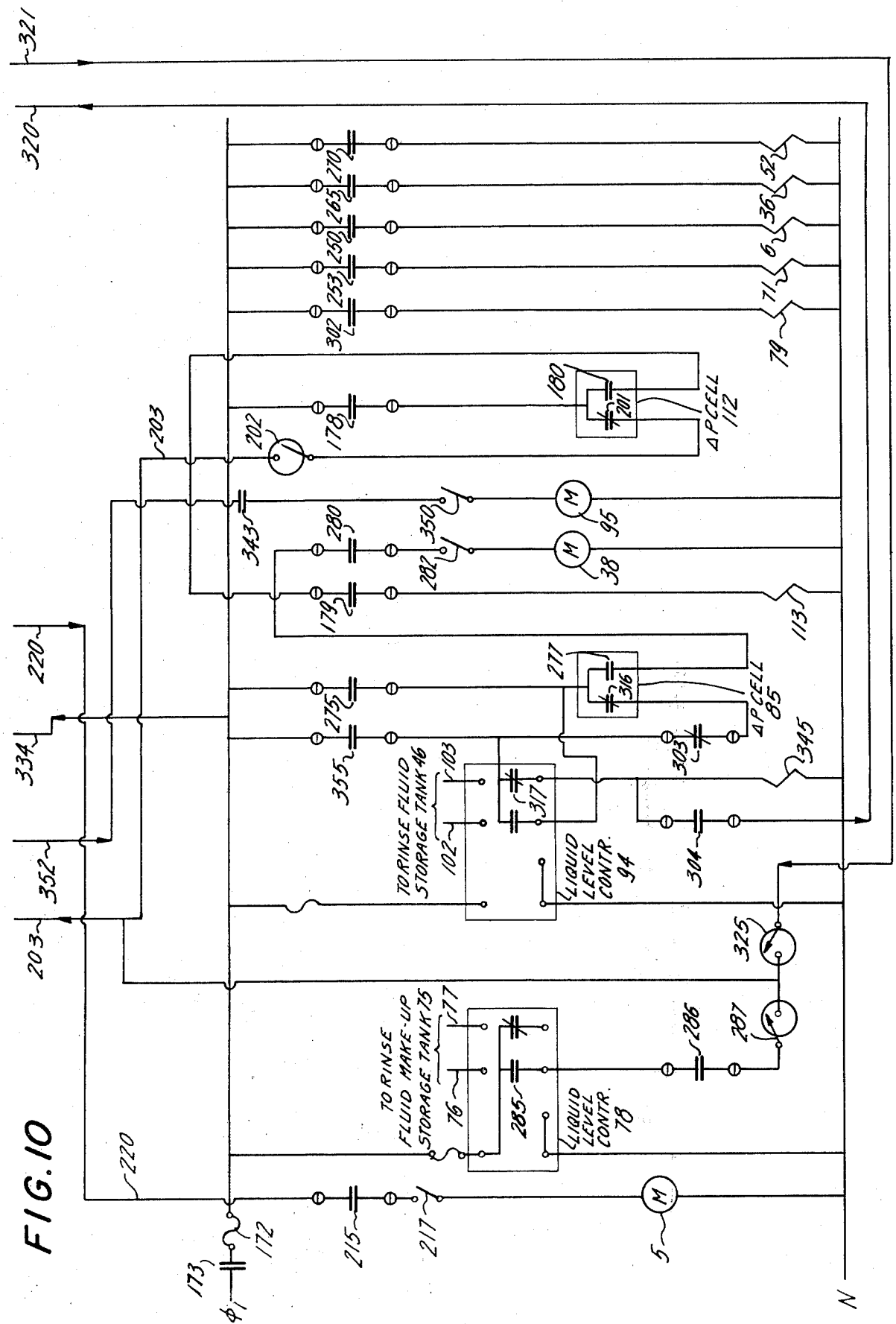

CONTROL SYSTEM FOR LIQUID-SOLID CONTACTING APPARATUS

This is a continuation of application Ser. No. 349,153, filed Apr. 9, 1973, which is a continuation-in-part of application Ser. No. 241,639, filed Apr. 6, 1972, both now abandoned.

BACKGROUND OF THE INVENTION

The present invention is directed to a method for controlling a countercurrent liquid-solid contactor and, more particularly, for more accurately controlling a countercurrent liquid-solid contactor so that dilution and contamination of the various product streams is minimized and the desired separation, concentration or conversion reactions are performed at peak efficiencies.

In all of the present day semi-continuous liquid-solid countercurrent, dense bed contactors, a hydraulic pulse of some fluid, e.g., water, is applied periodically in various ways to the solid phase in order to move the solid incrementally in a direction which is counter to the direction of the liquid phase movement; see Higgins, U.S. Pat. No. 2,815,322. The periodic movement of increments of the solid phase has the net effect of establishing in a given liquid-solid contacting zone, a set of concentration profiles, one in a liquid phase and one in a solid phase. There is always found at least two distinct liquid phases in the absorption and regenerating sections of the liquid-solid contactor. These phases may be entirely different solutions or they may be common solvent solutions of different concentrations with respect to some chemical constituent common to both solutions. In many instances these various liquid phases must be separated from one another in order to effectively accomplish the desired chemical or physical separations. The various liquid phases in a contacting zone must meet one another at more or less well-defined interfaces. They cannot be allowed to intermix. The only intermixing of the separate liquid phases that can normally be tolerated is the minute amount of intermixing which occurs as a consequence of diffusional mass transfer across the interfaces. Gross intermixing can and does cause excessive dilution of product streams, loss of regeneration because of regenerant dilution within the contactor, undesirable contamination of product phases, unfavorable chemical kinetics and loss of valuable chemical constituents.

The use of hydraulic pulse of fluid for pushing the solid phase within the contactor introduces some serious problems with respect to the maintenance of stable interfaces between the various liquid phases present in the contactor. The interfaces must be stable with respect to the degree of intermixing that occurs at the interface and with respect to their relative positions within the contactor. If a liquid-liquid interface were allowed to wander indiscriminately within a contacting zone, the advantages gained from the multi-stage countercurrent mass transfer operation would be lost.

Higgins, U.S. Pat. No. 3,579,322 describes the use of conductivity probes and metal-hydrogen detectors within the stripping and loading sections of an ion exchange contactor. These types of controls fail to give as effective and adequate interface positional control as that of the present invention. This failure is due to the fact that these prior art controls depend upon sharp, horizontal interfaces in order for the probes to continually sense and control at the same fixed point within the contactor.

SUMMARY OF THE INVENTION

The present invention provides the solution to the problems of intermixing between various liquid phases and positioning of the various interfaces in a countercurrent liquid-solid contacting apparatus. The apparatus over which the present invention is an improvement comprises a loop; first, second and third loop valves in the loop dividing it into a loading section, a pulse section and a regenerating or stripping section; feed means for supplying a liquid feed containing sorbable material to the loading section; a body of sorption solid filling at least a major portion of the loop; regenerating means for supplying regenerating fluid to the regenerating section to desorb the material sorbed during a loading cycle from the sorption solid; first removal means for removing from the regenerating section the material desorbed by the regenerating fluid; second removal means for removing from the loading section the processed liquid, e.g., the feed after it has been contacted with the sorption solid; and pulse inlet means for supplying a pulse fluid to the pulse section to periodically push the sorption solid in a direction counter to the direction of the flow of the feed in the loop.

The control system for the liquid-solid apparatus comprises (a) an outlet means in the loop for removing a portion of the pulse liquid from a section of the loop adjacent to the pulse section; (b) first control means connected to the outlet means and the second removal means for controlling the removal of the portion of the pulse liquid and for controlling the removal and introduction of other liquid streams in volumetric relation to the amount of pulse liquid which has been supplied to the pulse section; (c) second control means connected to the pulse section and the third loop valve for allowing the sorption solid to be admitted into the pulse section and for closing the third loop valve when a given amount of sorption solid has been admitted into the pulse section; (d) third control means connected to the pulse inlet means and the pulse section for sensing and controlling the amount of sorption solid movement in the loop and (e) programming means operably connected to the feed means, regenerating means, first and second removal means, and the first, second and third control means for activating each of the means connected thereto in a prearranged order.

The outlet means for removing a portion of the pulse liquid from the loop can be located either in the loading section and adjacent to the second loop valve or in the regenerating section below the inlet for the regenerating fluid depending on the particular service in which the loop contactor is placed.

In another embodiment of the contacting apparatus of this invention, rinse means is connected to the loop for supplying a rinse fluid to rinse the liquid feed from the sorption solid before the sorption solid enters an adjacent section in the loop and a fourth control means is connected to the rinse means for controlling the volume of rinse fluid that is supplied to the loop. A rinse removal means is connected to the loop and a fifth control means is connected to the rinse removal means and the first removal means for controlling the removal of the material desorbed by the regenerating fluid after a given volume of rinse fluid has been removed from the loop. The programming means is also connected to the fourth and fifth control means for activation of these means in a prearranged order with those described above.

In another embodiment of this invention, a fourth loop valve is positioned above the pulse section to form an overflow section having an outlet therein and backwash means is connected to the overflow section for supplying backwash fluid through the overflow section and the outlet in the overflow section. The backwash fluid is designed to carry over sorption solid fines which are produced during the sorption process and any other foreign matter entrained with the solid through the outlet provided in the top of the loop.

The countercurrent contactor of this invention can be employed in a wide variety of unit operations including separation, conversion and concentration. A few examples of the separation operations that lend themselves to the contactor are the removal of metal impurities and other contaminants from pickling, brightening or plating solutions used in the metal finishing industry and the separation of a feed stream into one or more products. One example of a conversion operation is the recovery of brightening solution or bright dip by cation ion exchange. Another example of the use of the contactor is the concentration of the metal salts in spent metal finishing solutions.

The sorption solid that is used in the contactor can be the conventional particulate resin which has the capacity for causing ion exchange such as the sulfonated copolymer of styrene, divinylbenzene and/or ethylvinyl benzene or it can be the new synthetic macrocyclic compounds of polyethers, polyamines, polythioethers and other related molecules; see SCIENCE, Vol. 174, Number 4008, pages 459–467 (Oct. 29, 1971). The latter materials, which have the ability to bind a variety of anions and cations, solubilize ionic substances in nonaqueous solvents and in membrane media.

BRIEF DESCRIPTION OF THE DRAWINGS

The present invention will be more readily understood when read in conjunction with the accompanying drawings in which:

FIG. 10 is a diagram of a third portion of the circuit employed by the volumetric control system of the present invention.

DETAILED DESCRIPTION OF THE PRESENT INVENTION

In an example of one of the separation operations referred to under SUMMARY OF THE INVENTION, a feed containing given concentrations of components A and B is separated into products A and B. There are a minimum of three liquid-liquid interfaces that are of concern in this separation operation that are to be controlled by the volumetric control system of present invention. These are the feed-rinse fluid interface, the processed liquid-pulse liquid interface and the rinse fluid-material desorbed by regenerating fluid interface.

A bed of ion exchange resin such as, for example, sulfonated copolymer of styrene, ethylvinylbenzene and divinylbenzene, contains about 70 volume % solids and about 30 volume % void space. When the hydraulic fluid pulse is supplied to the pulse section of the loop, the pulse liquid will advance through the void space at a rate that is faster than the rate the resin moves during the pulse cycle of the process. The excess pulse liquid volume required over and above the volume of the resin moved during a given time interval is defined as the liquid slippage or slip volume. The slip ratio is a measure of the amount of pulsing fluid required to move a given volume of resin in a given pulse cycle divided by the volume of resin moved during that cycle. The slip ratio normally varies from one pulse cycle to the next because it is a function of the hydraulic fluid pressure, the pulse volumetric rate and the compactness of the resin bed. The latter is influenced by the pressure and the volumetric rate at which the various liquid streams are contacted with the resin and the purity of these streams.

As a consequence of the resin and liquid movement in the loop during the pulse cycle, the liquid-liquid interfaces mentioned above are displaced around the loop in the same direction as the resin movement. Due to the liquid slippage described in the above paragraph, the liquid-liquid interfaces in the resin bed advance further than the distance traveled by the incremental amount of resin moved during the pulse cycle. The functioning of the volumetric control system of the present invention in restoring the liquid-liquid interfaces to their prepulse positions after a pulse cycle can be illustrated by considering the amount of feed rinse required to positionally reestablish the feed-feed rinse interface. The amount of feed rinse $V_R$ required is volumetrically related to the volume of pulse liquid $V_{PL}$ used in that it is equivalent to the total pulse liquid volume minus the volume of resin moved $V_P(1-\alpha)$. For example, if the resin contains exactly 0.33 fraction void space $\alpha$ and it requires 450 milliliters of pulse liquid to move the resin an increment $V_P$ of 300 milliliters, the actual amount of resin moved is equal to 300 (1. − 0.33) or 200 milliliters. Therefore, the amount of feed rinse required is equal to 450 − 200 or 250 milliliters.

Figure 1:
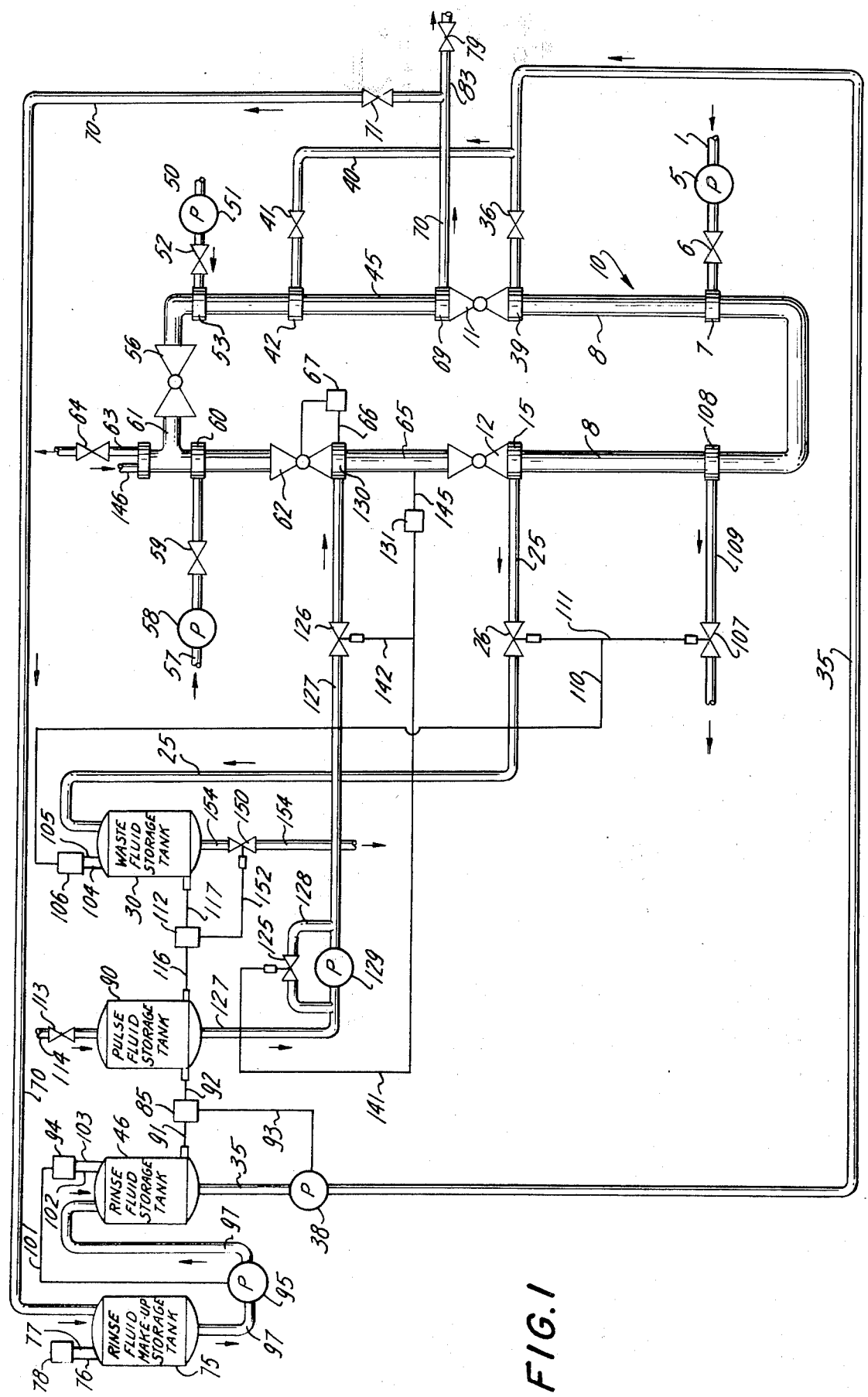
FIG. 1 is a schematic diagram of one embodiment of the liquid-solid contactor of the present invention.
Figure 2:
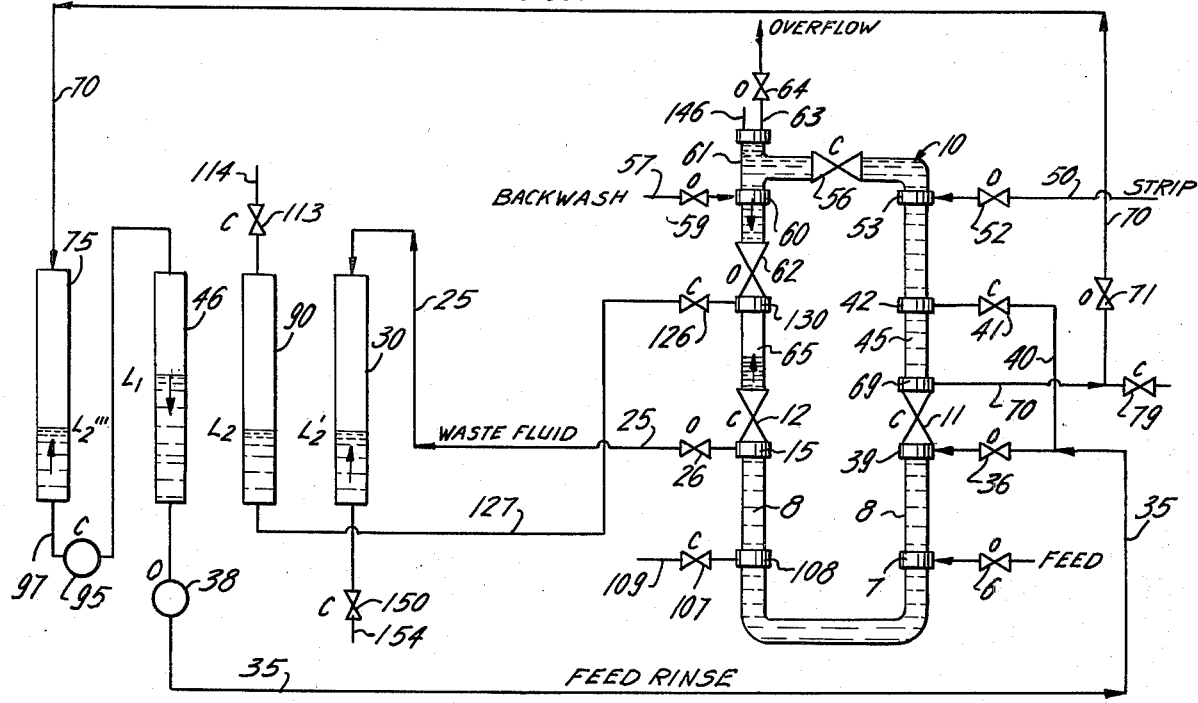
FIGS. 2–7 are diagrams of steps 1–6 of the operating cycle of the contactor, respectively, of one embodiment of the method of the present invention.

Referring now to the drawings in greater detail and FIGS. 1 and 2, in particular, the feed is pumped through supply conduit 1 from a feed source not shown via pump 5 through valve 6 and feed inlet 7 into loading section 8 of countercurrent ion exchange loop 10 which is substantially filled with the ion exchange resin. Loading section 8 of loop 10 is positioned between resin valve 11 and resin valve 12. The feed entering inlet 7 passes through the resin bed toward waste fluid outlet 15 below resin valve 12. The resin selectively sorbs component A and rejects component B, which components are separately collected. Prior to the collection of product B, a fluid, which for purposes of this example is referred to hereinbelow as a waste fluid, passes through outlet 15, line 25, waste fluid valve 26 to waste fluid storage tank 30. The waste fluid comprises a portion of the pulse liquid which is periodically introduced into loop 10.

Rinse fluid is pumped through line 35 and rinse fluid valve 36 via pump 38 to rinse fluid inlet 39 positioned below resin valve 11 in loading section 8 of loop 10. The rinse fluid is designed to remove the feed from the void spaced surrounding the resin particles before the resin passes into stripping section 45. The rinse fluid for this operation is stored in rinse fluid storage tank 46.

In an alternate method, valve 36 is closed and the rinse fluid is diverted through line 40, valve 41 and inlet 42 of stripping section 45. By following the alternate method, more space is available for removing the feed from the void spaced surrounding the resin. Resin valve 11 is open during steps 1 and 2 of this alternative method which means that the combined pressure of the feed and the feed rinse provides the force necessary to push the waste fluid into waste fluid storage tank 30.

Stripping fluid is pumped through supply conduit 50 from a source not shown via pump 51 through stripping fluid valve 52 and stripping fluid inlet 53 to stripping section 45 positioned between resin valve 11 and resin valve 56 above resin valve 11. Stripping section 45 is filled with resin from loading section 8. The function of the stripping fluid entering this section of the loop is to first strip from the resin the feed rinse which is introduced into section 45 with each increment of resin that is passed into this section and then to strip from the resin the sorbed product A.

Backwash fluid is pumped through supply conduit 57 from a source not shown via pump 58 through backwash valve 59 and backwash inlet 60 in overflow section 61 positioned between resin valve 56 and resin valve 62 below resin valve 56. The backwash fluid passes through the resin bed in overflow section 61 and removes entrained foreign matter and any resin fines that are formed during the ion exchange process and carries them overhead through conduit 63 and outlet valve 64. The overflow from 64 may be reused after the foreign matter and fines if any have been settled out of this stream. During step 1, as illustrated in FIG. 2, resin valve 62 is open to allow the resin in overflow section 61 flow by gravity into pulse section 65. Resin sensor probe 66 of resin sensor controller 67 senses that a given amount of stripped resin has been introduced into pulse section 65. At this point resin valve 62 is closed.

Figure 3:
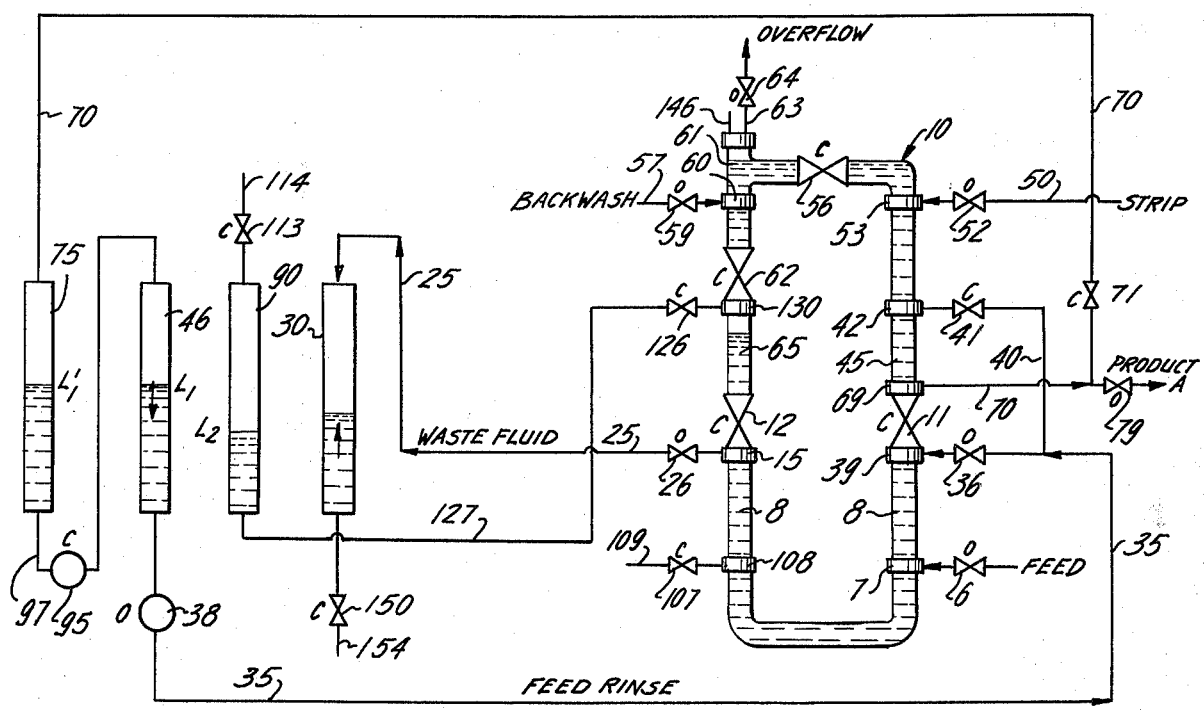

Rinse fluid is removed from stripping section 45 through rinse fluid outlet 69 positioned immediately above resin valve 11 in stripping section 45. The rinse fluid then passes through line 70, rinse fluid valve 71 into rinse fluid makeup storage tank 75 until probes 76 and 77 of liquid level controller 78 indicate that the established height of rinse fluid has been reached in rinse fluid makeup storage tank 75. For example, when height $L_1'$ has been reached in rinse fluid makeup tank 75, step 1 has been completed and the programming means shown in FIG. 8 advances the cycle to step 2 (see FIG. 3).

The programming means or programmer 82 is described below in connection with a detailed description of FIGS. 8–10. Briefly, programmer 82 automatically advances the cycle to the next succeeding step and activates the proper programmer switches in a prearranged order.

At the start of step 2, rinse fluid valve 71 is closed and product A valve 79 is opened to allow a liquid stream having a concentration of component A that is substantially higher in relation to component B to pass from line 70 through line 83 to product A storage means not shown. In an alternate method, Product A removal may be accomplished through separate outlet and conduit means other than outlet 69 and line 70 as shown in FIGS. 1–7.

Figure 4:
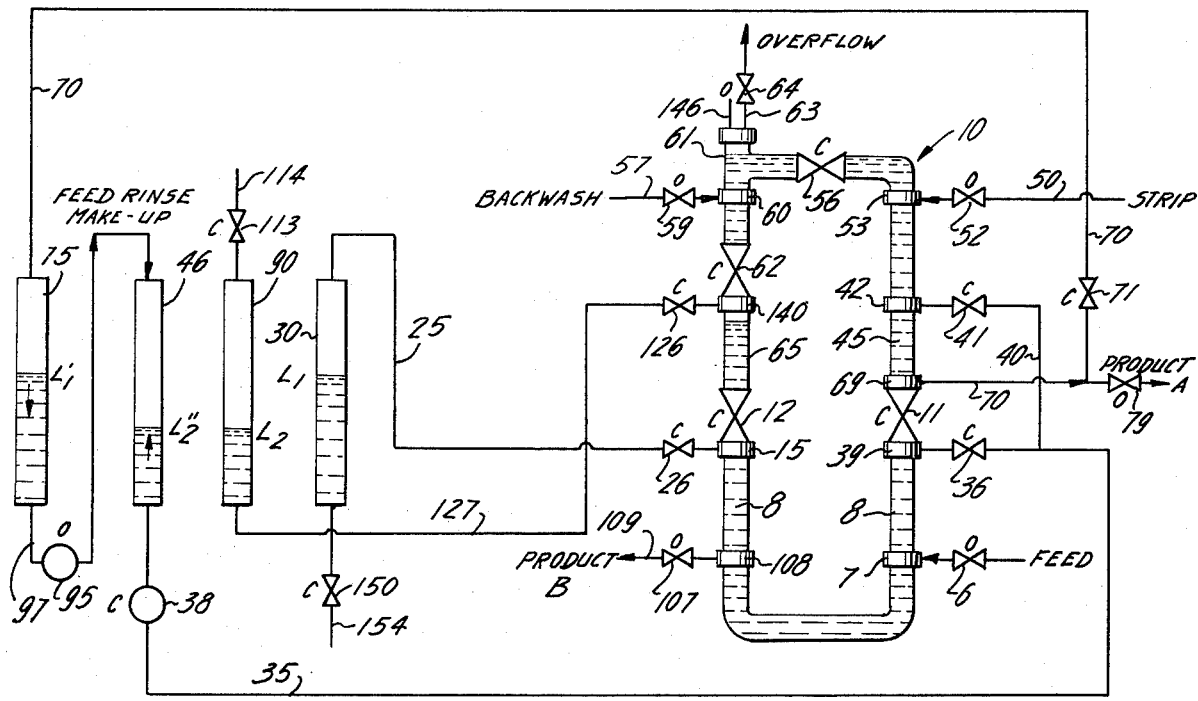

Differential pressure cell 85 is pneumatically connected between rinse fluid storage tank 46 and pulse fluid storage tank 90 and electrically connected to rinse fluid pump 38 by means of leads 91, 92 and 93, respectively through programmer 82. Differential pressure cell 85 is designed to shut off the flow of rinse fluid being pumped from rinse fluid storage tank 46 when the height of rinse fluid in rinse fluid storage tank 46 is equivalent to a predetermined difference in height with respect to the fluid in pulse fluid storage tank 90. This predetermined height difference will either be zero or some value greater than zero. For example, when height $L_2''$ has been reached in rinse fluid storage tank 46, the event which terminates step 2 has been completed and programmer 82 advances the cycle to step 3 as illustrated in FIG. 4. However, if the level in rinse fluid makeup storage tank 75 has not yet reached $L_1'$, step 1 continues even though the level in tank 46 has reached $L_2''$. In that event differential pressure cell 85 closes rinse fluid pump 38 and provides a signal permissive through step 2 of programmer 82 to advance the cycle to step 3. Under these set of conditions, as soon as $L_1$ has been reached in tank 75, programmer 82 automatically advances the cycle from step 1, through step 2 to step 3.

At the start of step 3, liquid level controller 94 is activated to open rinse fluid makeup pump 95 causing rinse fluid makeup to be transferred from rinse fluid makeup storage tank 75 to rinse fluid storage tank 46 through line 97. Liquid level controller 94 is electrically connected between rinse makeup pump 95 and rinse storage tank 46 by means of electrical lead 101. When probes 102 and 103 of liquid level controller 94 indicate the rinse fluid has reached height $L_1$ in rinse fluid storage tank 46, rinse makeup pump 95 is closed.

At some point during the run cycle which comprises steps 1–3, probes 104 and 105 of liquid level controller 106 on waste fluid storage tank 30 will indicate that the liquid level has reached $L_1$. This will cause waste fluid valve 26 to close and product B valve 107 to open. This allows a liquid stream having a concentration of component B that is substantially higher in relation to component A to pass through product B outlet 108 in loading section 8 positioned between waste fluid opening 15 and feed inlet 7 and through line 109 to product B storage means not shown. Liquid level controller 106 is electrically connected between waste fluid storage tank 30, waste fluid valve 26 and product B valve 107 by means of loads 110 and 111.

Figure 8:
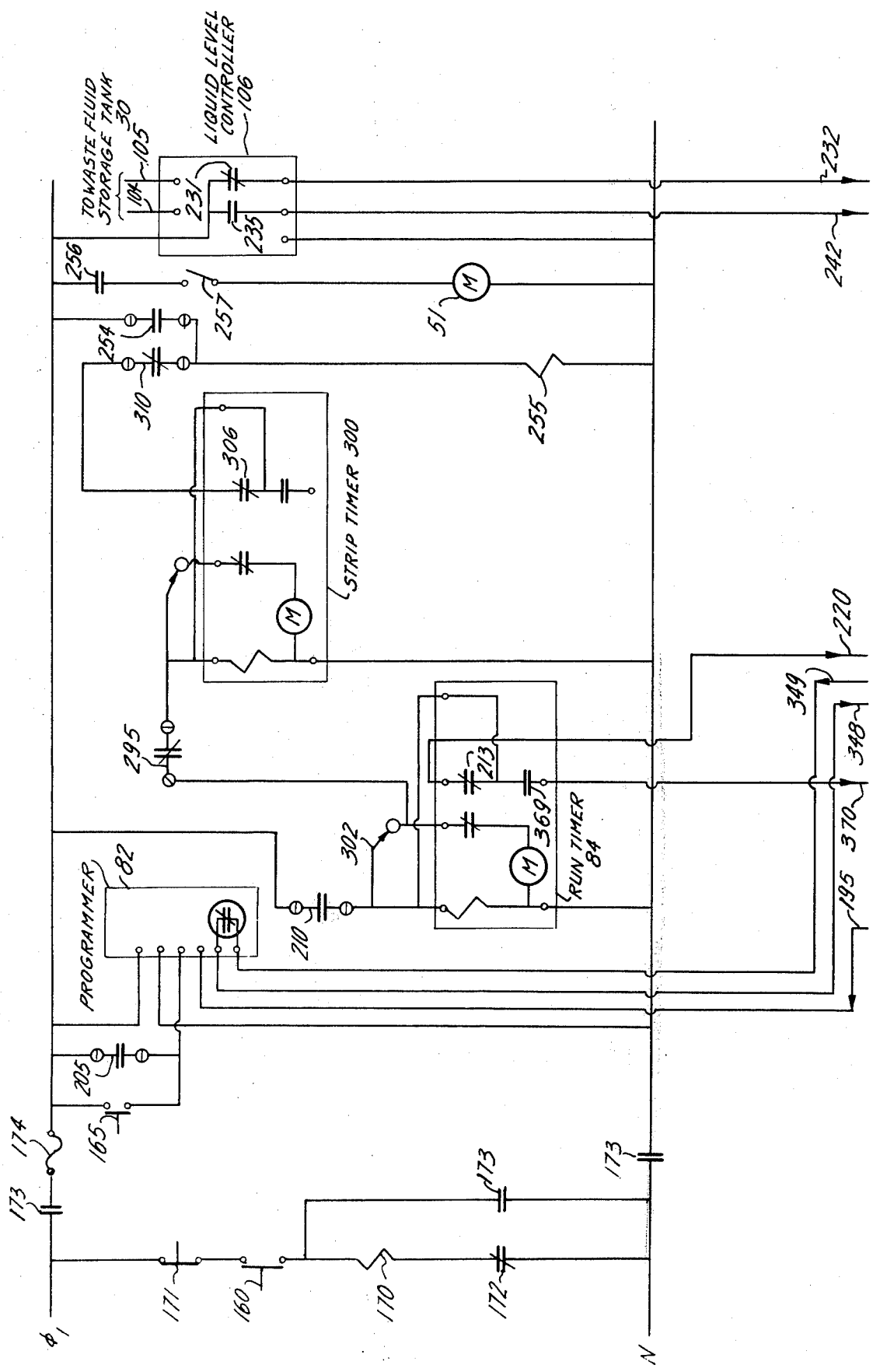
FIG. 8 is a diagram of one portion of the circuit employed by the volumetric control system of the present invention.

The run cycle is completed when run timer 84 shown in FIG. 8 has timed out based on a period fixed by the operator. After the completion of the run cycle, programmer 82 advances the cycle to step 4 as illustrated in FIG. 5.

Figure 6:
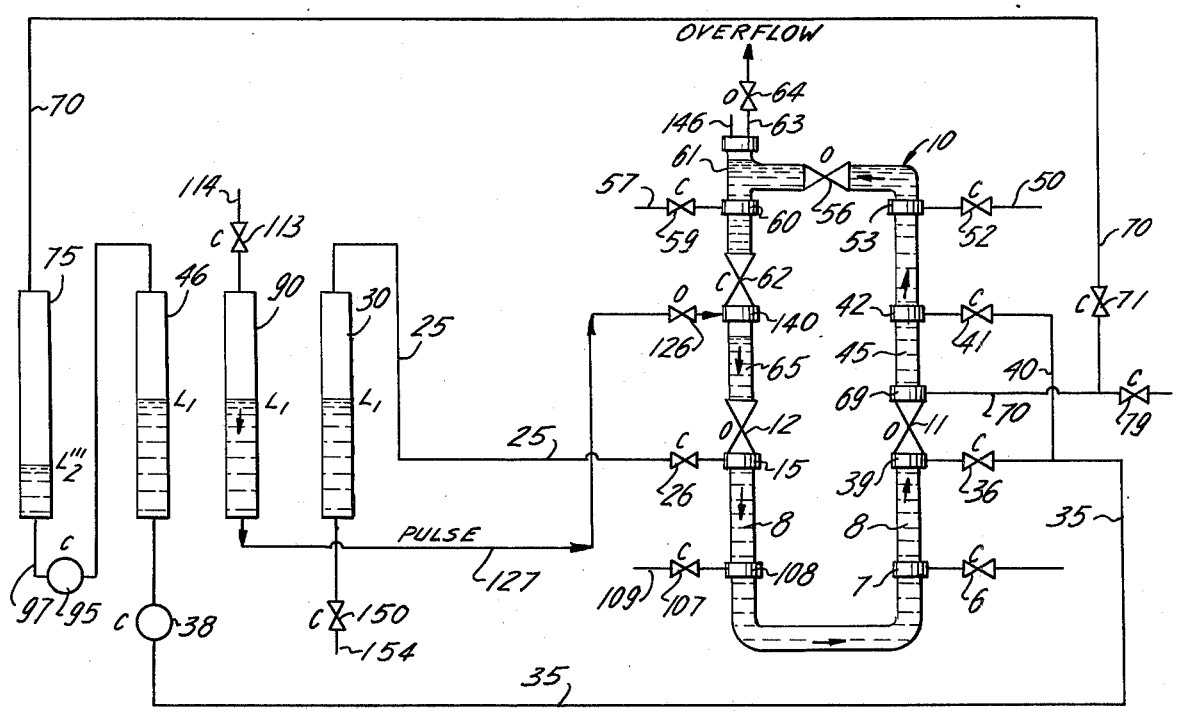

At the start of step 4, the prepulse step of the cycle, feed pump 5, valves 6, 52, 59, 79 and 107 are closed and resin valves 11, 12 and 56 are opened. Additionally, at the start of step 4, differential pressure cell 112 indicates that a given differential pressure exists between pulse storage tank 90 and waste fluid storage tank 30. Cell 112 will cause pulse fluid makeup valve 113 to open to allow pulse fluid to pass from pulse fluid makeup storage tank not shown through line 114 to pulse fluid storage tank 90. When height $L_1$ has been reached in pulse fluid storage tank 90, valve 113 is closed and step 4 has been completed and programmer 82 advances the cycle to step 5 as illustrated in FIG. 6. Differential pressure cell 112 is electrically connected to pulse fluid makeup valve 113, via programmer 82, and is pneumatically connected to pulse fluid storage means 90 and waste fluid storage means 30 by means of leads 116 and 117, respectively.

Figure 5:
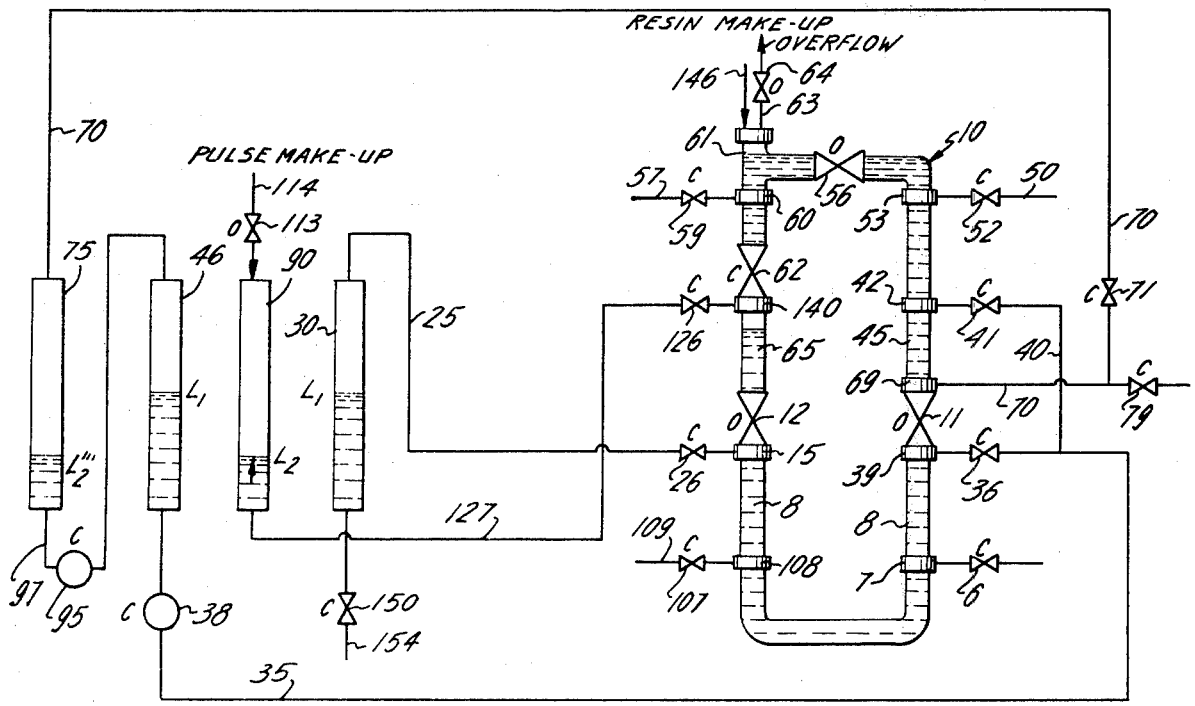

Makeup resin may be introduced via inlet 146, as shown in FIG. 5, into overflow section 63 during any step except step 5, if required to make up for any losses during the ion exchange operation.

Figure 7:
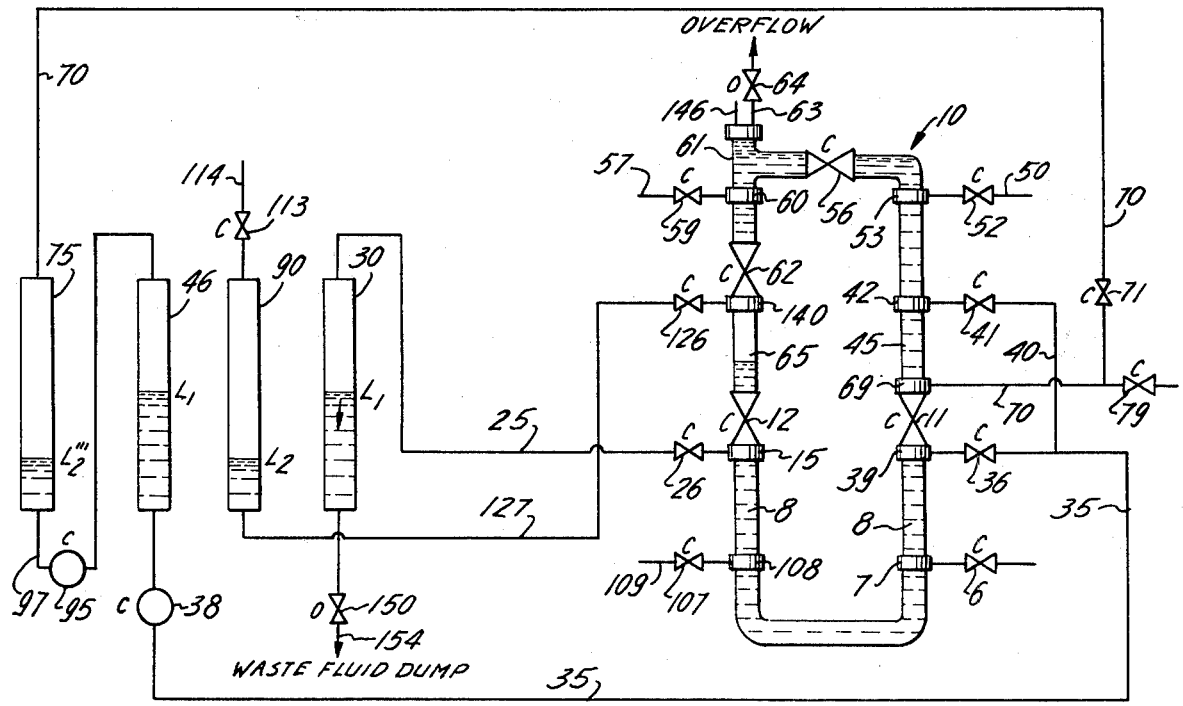

At the start of step 5, (see FIG. 6) the pulse step of the cycle, the pulse fluid recycle valve 125 is closed and the pulse valve 126 is opened. The pulse fluid which has been recycling through line 127 and 128 by means of pulse fluid pump 129 now passes into pulse fluid inlet 130 positioned immediately below resin valve 62 in pulse section 65. Resin sensor controller 131 is electrically connected to programmer 82 which is electrically connected to pulse fluid recycle valve 125 and pulse fluid valve 126 by means of leads 141 and 142. Pulse fluid introduced through pulse inlet 130 pushes the resin through resin valve 12 for a given incremental distance which is sensed by resin sensor probe 145 of resin sensor controller 131. Similarly, the resin is pushed around loop 10 so that a portion of the resin in loading section 8 passes through resin valve 11 into stripping section 45 to replace an equal portion which is pushed through resin valve 56 into overflow section 63. When sensor probe 145 senses that the resin has been pushed downward out of pulse section 65, the given incremental distance, step 5 has been completed and programmer 82 advances the cycle to step 6 as illustrated in FIG. 7.

At the start of step 6, the post pulse step of the cycle, resin valves 11, 12 and 56 are closed. Pulse tank 90 has dropped to level $L_2$ as indicated in FIG. 7 which means that a given differential pressure exists between pulse fluid storage tank 90 and waste fluid storage tank 30. At this instant differential pressure cell 112, which is also electrically connected to waste fluid dump valve 150 via programmer 82 by means of lead 152, causes waste fluid dump valve 150 to open. The waste fluid in waste fluid storage tank 30 is allowed to pass through line 154 to a vessel not shown. When height $L_2'$ has been reached in waste fluid storage tank 30, waste fluid dump valve 150 is closed, step 6 has been completed and programmer 82 advances the cycle back to step 1.

Prior to the initial start-up of ion exchange loop 10, waste fluid storage tank 30 and rinse fluid storage tank 46 are each manually filled to height $L_1$ with fluid. In addition, rinse fluid makeup storage tank 75 is manually filled to height $L_2'''$ with fluid. The actual initial start-up operation begins with step 4, the pre-pulse step of the cycle.

Figure 9:
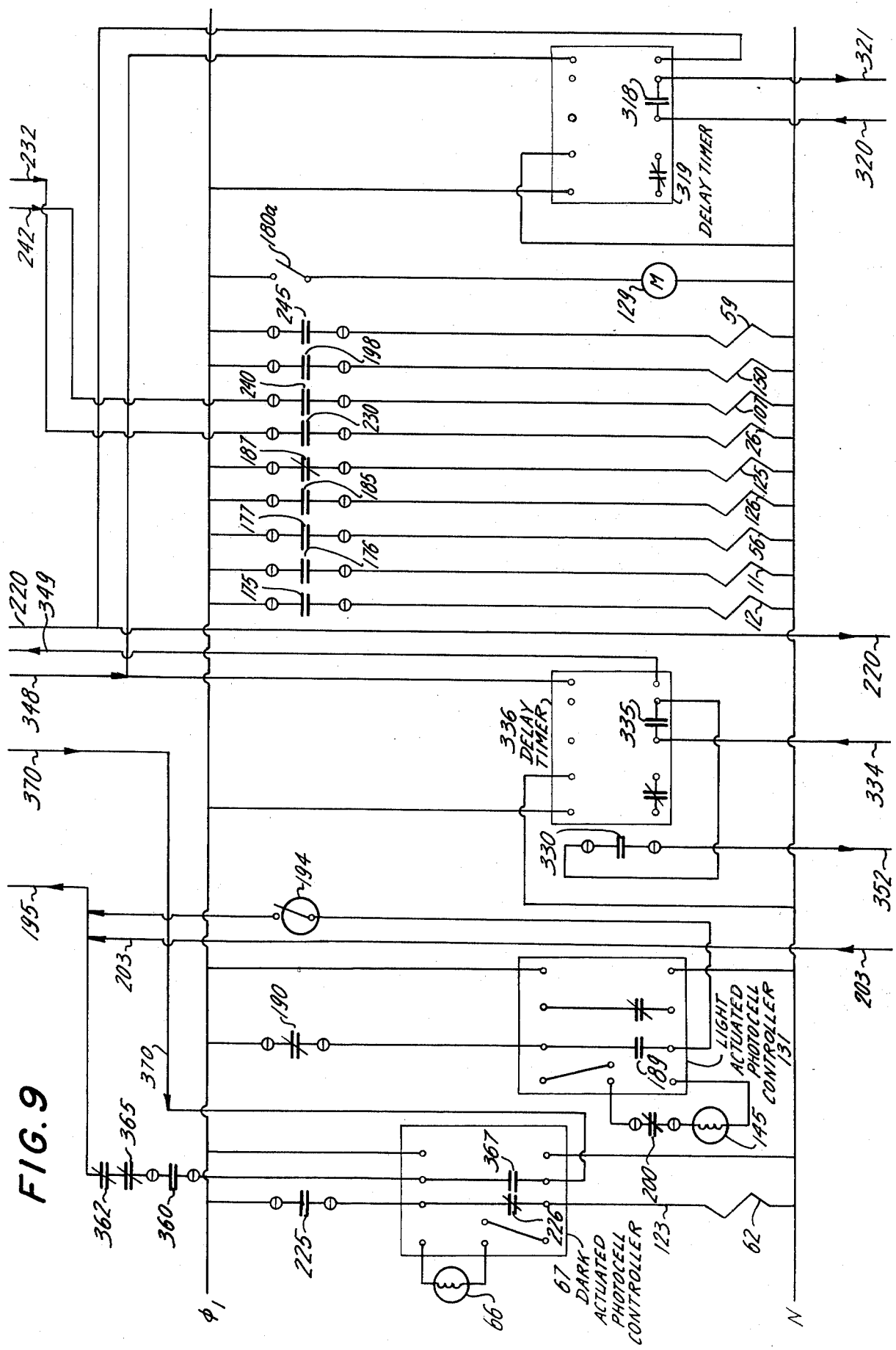
FIG. 9 is a diagram of a second portion of the circuit employed by the volumetric control system of the present invention.

Referring now to FIGS. 8–10, starting switch 160 is pushed to energize the entire control circuit. Starting switch 165 is provided to enable one to manually interrupt the programmed order of programmer 82 and cause the cycle to advance to the next succeeding step if this becomes necessary.

Commercially available motor-driven drum controllers are employed as the programmer. One suitable drum controller is the commercially available Tenor Stepping Drum Programmer Model 250 manufactured by Tenor Company of Milwaukee, Wis.

As soon as the circuit is energized the following four operations of initial step 4 simultaneously occur:
1. Relay coil 170 is energized through stop switch 171 and normally closed contacts 172 which causes normally open contacts 173 to close. Overload fuse 174 is provided in the circuit as a safety feature.
2. Resin valves 12, 11 and 56 are opened through the closing of normally open programmer switches 175, 176 and 177, respectively, of programmer 82.
3. Valve 113 is opened through the closing of programmer switches 178 and 179 permissive through the normally open contacts 180 of differential pressure cell 112. This allows pulse liquid to enter the pulse fluid storage tank 90 until it is filled to height $L_1$ with liquid.
4. Pulse fluid pump 129 is energized through switch 180a.

After these four operations have occurred, programmer 82 advances the cycle to step 5, the pulse step, and the following two operations of step 5 simultaneously occur:
1. Pulse valve 126 is opened through normally open programmer switch 185.
2. Pulse fluid recycle valve 125 is closed through normally closed programmer switch 187.

Pulse liquid enters pulse inlet 130 and pushes a predetermined volume of resin from pulse section 65. The resin will continue to be pushed from this section until the resin-water interface passes resin sensor probe 145 of light actuated photocell controller 131 which closes normally open contacts 189 of controller 131.

One suitable photocell controller is the commercially available Model A725 Autotron manufactured by Autotron, Inc. of Danville, Ill.

As soon as contacts 189 are closed, normally closed programmer switch 190 supplies current through normally closed hold switch 194 to programmer 82 via lead 195 to terminate step 5 and to advance the cycle to step 6. The termination of step 5 is permissive through normally open contacts 189 of controller 131.

When programmer 82 advances the cycle to step 6, the following four operations simultaneously occur:
1. Resin valves 12, 11 and 56 are closed through the opening of programmer switches 175, 176 and 177, respectively.
2. Waste fluid dump valve 150 is opened through the closing of normally open programmer switch 198.
3. Current is supplied to differential pressure ($\Delta$ P) cell 112 through the closing of normally open programmer switch 178.

One suitable differential pressure cell is the commercially available Meletron Diaphragm Differential Pressure Switch Model 227E manufactured by Meletron Corporation of Los Angeles, Calif.

4. Switch 200 causes sensor 131 to become disconnected from the circuit so that the relay within controller 131 can be reset.

When these four operations have occurred, waste fluid is removed from waste fluid tank 30. When the level in tank 30 drops to $L_2'$, normally closed contacts 201 of $\Delta$ P cell 112 close to supply current through normally closed hold switch 202 to programmer 82 via leads 203 and 195 to terminate step 6.

Normally open programmer switch 205 closes on the termination of step 6 to advance programmer 82 to step 1 of the cycle.

When programmer 82 advances the cycle to step 1, the following ten operations simultaneously occur:
1. Normally open programmer switch 210 closes to supply current to energize run timer 84 which is set for a given time interval before the cycle is advanced from step 3 to step 4. Run Timer 84 will in turn energize feed pump 5 through normally closed contacts 213, normally open programmer switch 215 and hold switch 217 through lead 220.
2. Normally open programmer switch 225 closes to open resin valve 62 through normally closed contacts 226 of dark actuated photocell controller 67.
3. Normally open programmer switch 230 closes to open waste fluid valve 26 through normally closed contacts 231 of liquid level controller 106 via lead 232. This will cause waste fluid to enter waste fluid tank 30.
4. Normally open programmer switch 245 closes to open backwash valve 59.
5. Normally open programmer switch 250 closes to open feed valve 6.
6. Normally open programmer switch 253 closes to open feed rinse recycle valve 71 to allow feed rinse recycle to be fed into rinse fluid makeup storage tank 75.
7. Normally open programmer switch 254 closes which energizes the relay coil 255. Strip pump 51 is then started through the normally open contacts 256 of relay coil 255 which is permissive through hold switch 257.
8. Normally open programmer switch 265 closes to open feed rinse valve 36.
9. Normally open programmer switch 270 closes to open strip valve 52.
10. Normally open programmer switch 275 closes to supply current through normally open contacts 277 of $\Delta P$ cell 85 through normally open programmer switch 280 and through hold switch 282 to start feed rinse pump 38.

After these ten operations have occurred, the resin falls into pulse section 65 until section 65 is filled to resin sensor probe 66 of dark actuated photocell controller 67. At this point light is prevented from reaching probe 66 and normally closed contacts 226 of photocell controller 67 are opened which causes resin valve 62 to close and to prevent further resin flow into pulse section 65. The rinse fluid recycle is fed into feed rinse makeup storage tank 75 until height $L_1'$ is reached therein as determined by probes 76 and 77 of liquid level controller 78. When $L_1'$ is reached in tank 75, normally open contacts 285 of controller 78 will close which will cause programmer 82 to advance the cycle from step 1 to step 2. This operation is permissive through normally open programmer switch 286 and hold switch 287 which are closed via leads 203 and 195 to programmer 82.

One suitable liquid level controller is the commercially available Solu Bridge Liquid Level Controller Model RE-173 manufactured by Beckman Instrument Company of Fullerton, Calif.

The following operations simultaneously occur in step 2:
1. Normally closed programmer switch 295 closes to energize strip timer 300 which is set for the time necessary to strip component A from the resin and to obtain the maximum concentration of component A in product A that is removed from stripping section 45.

Suitable strip and run timers are the commercially available Eagle Signal Cycl-Flex Reset Timers manufactured by Eagle Signal Company, a division of E. W. bliss Company of Davenport, Iowa.

2. Normally open programmer switch 253 opens to close feed rinse recycle valve 71.
3. Normally open programmer switch 302 closes to open product A valve 79. Product A will now be diverted to product A storage tank through valve 79.
4. Normally closed programmer switch 303 and normally open programmer switch 304 close.

After strip timer 300 is energized, relay coil 255 continues to be energized through normally closed contacts 306 of timer 300 which are permissive through normally closed programmer switch 310. Strip pump 51 which was started in step 1 will continue to run until strip timer 300 times out. When this occurs, normally closed contacts 306 open and de-energize relay coil 255 to open relay coil 255 contacts 256 and stop pump 51.

Feed rinse continues to be supplied through inlet 42 in stripping section 45 until liquid level in feed rinse tank 46 drops to $L_2''$, at which time normally closed contacts 316 of $\Delta P$ cell 85 will close. This causes the current to flow permissive through normally closed contacts 317 of liquid level controller 94, through normally open contacts 318 of delay timer 319 via leads 320 and 321 and through hold switch 325. The circuit is completed through leads 203 and 195 to programmer 82 which advances the cycle from step 2 to step 3.

One suitable delay timer is Industrial Solid State Timer manufactured by Industrial Solid State Controls, Inc. of York, Pennsylvania.

The following four operations occur simultaneously in step 3:
1. Normally open programmer switch 330 closes to start feed transfer pump 95 via lead 334 through normally open contacts 335 of delay timer 336, through normally open contacts 343 of relay 345 and through hold switch 350 via lead 352.
2. Normally open programmer switch 355 closes to close normally open contact 343 of relay coil 345 through normally closed contacts 317 of liquid level controller 94.
3. Normally open programmer switch 265 opens to close feed rinse valve 36.
4. Normally open programmer switch 360 closes to set up programmer 82 advance circuit through normally closed contacts 362 of relay coil 345, through normally closed contacts 365 of relay coil 255, through normally open contacts 367 of dark actuated photocell controller 67 and through normally open contacts 369 of run timer 84 via lead 370.

The normally open contacts 335 of delay timer 336 remain open until the delay timer 336 times out, at which time normally open contacts 335 close and feed transfer pump 95 is actuated through the normally open contacts 343 of relay 345. Delay timer 336 is set at a fixed interval of time in order to prevent a false signal through probes 102 and 103 of liquid level controller 94 to stop feed rinse transfer pump 95 when it initially starts pumping feed rinse makeup into feed rinse storage tank 46.

Feed rinse transfer pump 95 continues pumping until probes 102 and 103 sense that the level in tank 46 has reached $L_1$. At this time normally closed contacts 317 of liquid level controller 94 will open to de-energize relay coil 345 which in turn stops transfer pump 95.

Normally open contacts 369 of run timer 84 close as soon as run timer 84 times out. This advances the cycle from step 3 to step 4 through normally closed contacts 362 and 365, programmer switch 360 and normally open contacts 367 as stated under operation 4 of step 3 above.

The following three operations occur simultaneously in step 4:

1. Normally open programmer switches 175, 176 and 177 close to open resin valve 12, 11 and 56, respectively.
2. Normally open programmer switches 178 and 179 close to open pulse makeup valve 113 permissive through normally open contacts 180 of Δ P cell 112.
3. Normally closed programmer switch 200 opens to break the circuit to photocell 145 of controller 131.

Programmer switch 200 opens the light sensing circuit of controller 131 to provide a completely dark situation to insure that the relay (not shown) of controller 131 resets to the proper position for performing its function in step 5. Stray light from external sources reaching photocell 145 has been known to hold controller 131 relay in the light actuated position. If the programmer 82 advances into the pulse step, step 5, with controller 131 relay in the light actuated position either because no resin entered pulse section 65 or because the relay did not reset due to extraneous light reaching photocell 145, the pulse step will not take place and the cycle will be immediately advanced from step 5 to step 6.

Pulse makeup liquid enters pulse fluid storage tank 90 through valve 113 until the level in tank 90 reaches $L_1$. At this point normally open contacts 180 of Δ P cell 112 open to close valve 113 and normally closed contacts 201 of Δ P cell 112 close to supply current through hold switch 202 and leads 203 and 195 to programmer 82. Programmer 82 then advances the cycle from step 4 to step 5. At this point one cycle is completed and the cycle is repeated as desired to achieve the given separation, concentration or conversion reaction.

The reaction is performed at its peak efficiency with a minimum of dilution and contamination of the various product streams because of the control the system of this invention has over the liquid-liquid interface positions and the liquid streams introduced and removed from the loop. This system accomplishes this control by avoiding any dependence on sharp, horizontal interfaces which are not possible to maintain in actual practice.

A major portion of waste phosphoric acid can be effectively recovered from plant effluent in aluminum metal finishing operations. The phosphoric acid is transferred from waste effluent by sorption on the ion exchange resin that has been brought into contact with it, in the manner heretofore described in detail.

The following charts show that a waste phosphoric acid feed having an aluminum concentration in the range of 15 to 20 grams per liter and 3.5 molar phosphoric acid concentration can be treated to yield a "waste" stream having an aluminum concentration in the range of about 16 to 18.3 grams per liter and an acid concentration in the molar range of from about 1 to 1.5.

In the system the waste stream flow rate ranged from 1.2 to 1.8 liters per hour thus giving an aluminum recovery of about 21 to 30 grams per hour and an acid recovery of about 1.4 to 2 moles per hour.

The "product" stream acid concentration was in the molar range of 2.3 to 2.5 and aluminum concentration was in the range of 0.85 to 1 grams per liter. The flow rate was in the range from 1.2 to 1.35 liters per hour and therefore the molar per hour recovery of acid varied between about 3 and 4 and the aluminum varied between about 1.1 and 1.3 grams per hour.

In the runs 1 through 12 of Charts 1 and 2 cycle time was five minutes, included a run time of three minutes, during which time feed was supplied to the column a strip time of 1 5/6 minutes a pulse time of one minute and a prepulse of one minute.

CHART NO. 1

| | FEED CONCENTRATION | | RATE | | | PRODUCT CONCENTRATION | | RATE | | |
|---|---|---|---|---|---|---|---|---|---|---|
| | Al gm/liter (range) | Acid M | Liter/Hour | Al at 15–20 gm/ltr | Acid M/hr | Acid M | Al gm/ltr | Rate l/hr | Acid M/hr | Al gm/hr |
| 1 | 15–20 | 3.5 | 1.5 | 22.5–30 | 5.25 | 2.5 | 0.92 | 1.2 | 3 | 1.104 |
| 2 | 15–20 | 3.5 | 1.6 | 24–32 | 5.6 | 2.5 | 0.85 | 1.3 | 3.25 | 1.105 |
| 3 | 15–20 | 3.5 | 1.4 | 21–28 | 4.9 | 2.5 | 0.90 | 1.3 | 3.25 | 1.17 |
| 4 | 15–20 | 3.5 | 1.6 | 24–32 | 5.6 | 2.5 | 0.90 | 1.35 | 3.375 | 1.215 |
| 5 | 15–20 | 3.5 | 1.4 | 21–28 | 4.9 | 2.4 | 0.95 | 1.3 | 3.12 | 1.235 |
| 6 | 15–20 | 3.5 | 1.6 | 24–32 | 5.6 | 2.4 | 0.85 | 1.3 | 3.12 | 1.105 |
| 7 | 15–20 | 3.5 | 1.6 | 24–32 | 5.6 | 2.35 | 1.00 | 1.3 | 3.055 | 1.3 |
| 8 | 15–20 | 3.5 | 1.4 | 21–28 | 4.9 | 2.35 | 0.95 | 1.3 | 3.055 | 1.235 |
| 9 | 15–20 | 3.5 | 1.6 | 24–28 | 5.6 | 2.3 | 0.90 | 1.3 | 2.99 | 1.17 |
| 10 | 15–20 | 3.5 | 1.4 | 21–28 | 4.9 | 2.3 | 0.90 | 1.3 | 2.99 | 1.17 |
| 11 | 15–20 | 3.5 | 1.6 | 24–32 | 5.6 | 2.3 | 0.95 | 1.3 | 2.99 | 1.235 |
| 12 | 15–20 | 3.5 | 1.6 | 24–32 | 5.6 | 2.3 | 0.85 | 1.3 | 2.99 | 1.105 |

CHART NO. 2

| | WASTE CONCENTRATION | | RATE l/hr | ACID M/hr | AL gm/hr | WASTE SLIP RATE l/hr | ACID M | ACID M/hr | OVERFLOW CONC. Acid M | RATE l/hr | ACID M/hr |
|---|---|---|---|---|---|---|---|---|---|---|---|
| | Acid M | Al gm/l | | | | | | | | | |
| 1 | 1.1 | 17.33 | 1.7 | 1.87 | 29.46 | 5 | 0.1 | .5 | 0.45 | 1.7 | .765 |
| 2 | 1.1 | 16.25 | 1.3 | 1.43 | 21.12 | 5 | 0.1 | .5 | 0.45 | 1.7 | .765 |
| 3 | 1.2 | 17.45 | 1.2 | 1.44 | 20.94 | 5 | 0.1 | .5 | 0.45 | 1.7 | .765 |
| 4 | 1.3 | 17.7 | 1.25 | 1.625 | 22.12 | 5 | 0.15 | .75 | 0.45 | 1.7 | .765 |
| 5 | 1.35 | 18.2 | 1.2 | 1.62 | 21.84 | 5 | 0.15 | .75 | 0.45 | 1.7 | .765 |
| 6 | 1.35 | 17.95 | 1.2 | 1.62 | 21.54 | 5 | 0.15 | .75 | 0.45 | 1.7 | .765 |

-continued
CHART NO. 2

| | CONCENTRATION Acid M | Al gm/l | WASTE RATE l/hr | ACID M/hr | AL gm/hr | WASTE SLIP RATE l/hr | ACID M | ACID M/hr | OVERFLOW CONC. Acid M | RATE l/hr | ACID M/hr |
|---|---|---|---|---|---|---|---|---|---|---|---|
| 7 | 1.0 | 16.1 | 1.8 | 1.8 | 28.98 | 4.5 | 0.1 | .45 | 0.45 | 1.3 | .585 |
| 8 | 1.1 | 17.45 | 1.3 | 1.43 | 22.68 | 4.5 | 0.1 | .45 | 0.45 | 1.4 | .63 |
| 9 | 1.1 | 17.8 | 1.3 | 1.43 | 23.14 | 4.5 | 0.1 | .45 | 0.45 | 1.4 | .63 |
| 10 | 1.1 | 17.95 | 1.3 | 1.43 | 23.33 | 4.5 | 0.1 | .45 | 0.45 | 1.4 | .63 |
| 11 | 1.1 | 18.1 | 1.3 | 1.43 | 23.53 | 4.5 | 0.1 | .45 | 0.45 | 1.4 | .63 |
| 12 | 1.5 | 18.31 | 1.3 | 1.95 | 23.8 | 4.5 | 0.1 | .45 | 0.45 | 1.4 | .63 |

What is claimed is:

1. A method of controlling the position of liquid-liquid interfaces in a cyclical process employing a liquid-solids contacting apparatus comprising a loop having a pulsing section, a loading section, and a stripping section, at least a major portion of said loop being filled with a solid sorption medium, wherein during a pulse cycle solids are moved a predetermined distance corresponding to volume $V_P$ by means of a pulse fluid introduced to the pulsing section, and wherein during a treatment cycle feed containing at least one sorbable material and at least one non-sorbable material is introduced to the loading section, stripping fluid is introduced to the stripping section, a first product comprising sorbable material is recovered from a location between the feed and stripping fluid inlet points and a second product comprising non-sorbable material is recovered from a location between the feed and pulse fluid inlet points, which method comprises:
   a. measuring the volume $V_{PL}$ of pulse fluid necessary to move the solids said predetermined distance $V_P$ during a pulse cycle;
   b. after completion of said pulse cycle introducing during the subsequent treatment cycle a volume $V_R$ of rinse fluid into the loop countercurrent to the direction of flow of said pulse fluid, the relationship between volumes $V_R$, $V_{PL}$, and $V_P$ being about $V_R = V_{PL} - V_P(1-\alpha)$, where $\alpha$ is the void fraction of the solids,
   c. removing a waste fluid which includes a substantial portion of said pulse fluid from a section of the loop adjacent to said pulsing section prior to recovery of the second product, and
   d. recovering about a volume $V_R$ of rinse fluid from the stripping section prior to recovery of the first product.

2. The method of claim 1 wherein the pulse volume $V_P$ is controlled by means of a level control device operating on the solid-liquid interface in the pulse section.

3. The method of claim 2 wherein said level control means is a photo electric device sensing the solid-liquid interface.

4. The method of claim 1 wherein the rinse fluid is introduced from a first external rinse fluid storage vessel, the pulse fluid is introduced from an external pulse fluid storage vessel and the rinse fluid volume $V_R$ is controlled by level control means activated by changes in levels in the pulse fluid storage vessel and the first rinse fluid storage vessel.

5. The method of claim 4 wherein the rinse fluid recovered from the stripping section is recycled to a second rinse fluid storage vessel communicating with the first rinse fluid storage vessel.

6. The method of claim 5 wherein the volume of rinse fluid recovered from said stripping section is controlled by means of level control means activated by changes in levels in the first and second rinse fluid storage vessels.

7. The method of claim 6 wherein said level control means are liquid level controllers.

8. The method of claim 4 wherein the waste fluid is introduced into a waste fluid vessel.

9. The method of claim 8 wherein the volume of waste fluid recovered is controlled by level control means activated by changes in levels in the pulse fluid storage vessel and the waste fluid vessel.

10. The method of claim 1 wherein said rinse fluid is introduced to the loading section.

11. The method of claim 1 wherein said rinse fluid is introduced to the stripping section.

12. The method of claim 1 wherein the rinse fluid is introduced to the loop simultaneously with the introduction of feed to the loading section.

13. The method of claim 1 wherein the loop of the contacting apparatus contains an overflow section and a backwash fluid is supplied to said overflow section.

14. The method of claim 1 wherein the feed introduced to the loading section is spent brightening solution containing metal salt impurities and wherein the first product withdrawn from the stripping section is brightening solution containing substantially less metal salt impurities than the feed.

15. The method of claim 14 wherein said brightening solutions are phosphoric acid solutions.

16. The method of claim 14 wherein the second product comprising non-sorbable material is a solution of aluminum salts containing substantially less acid than the feed.

17. The method of claim 14 wherein said spent brightening solution is an effluent from an aluminum metal finishing operation.

* * * * *

UNITED STATES PATENT OFFICE
CERTIFICATE OF CORRECTION

Patent No. 3,969,242   Dated July 13, 1976

Inventor(s) David C. Kruse

It is certified that error appears in the above-identified patent and that said Letters Patent are hereby corrected as shown below:

Column 5, line 7, "spaced" should read --- spaces ---.

Column 6, line 49, "loads" should read --- leads ---.

Column 9, line 68, "bliss" should read --- Bliss ---,

Signed and Sealed this

Ninth Day of November 1976

[SEAL]

Attest:

RUTH C. MASON
Attesting Officer

C. MARSHALL DANN
Commissioner of Patents and Trademarks